Figure 1:
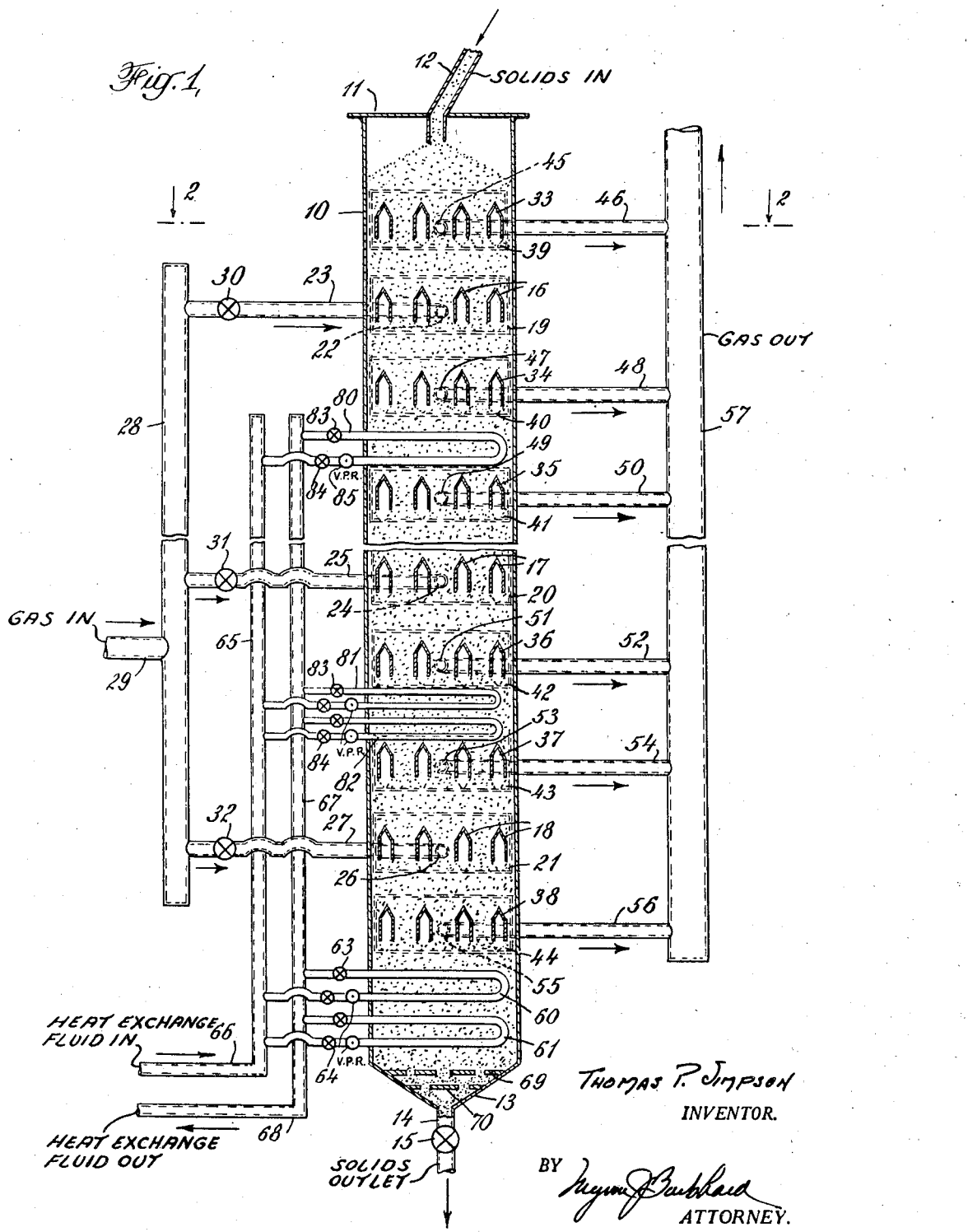

Jan. 4, 1949.   T. P. SIMPSON   2,458,434
METHOD AND APPARATUS FOR REGENERATING MOVING BED
PARTICLE FORM CONTACT MASS MATERIALS
Filed April 26, 1944   2 Sheets-Sheet 2

Thomas P. Simpson
INVENTOR.
BY
ATTORNEY.

Patented Jan. 4, 1949

2,458,434

UNITED STATES PATENT OFFICE 2,458,434

METHOD AND APPARATUS FOR REGENERATING MOVING BED PARTICLE FORM CONTACT MASS MATERIALS

Thomas P. Simpson, Woodbury, N. J., assignor to Socony-Vacuum Oil Company, Incorporated, a corporation of New York Application April 26, 1944, Serial No. 532,802

9 Claims. (Cl. 252—418)

This invention has to do with a method and apparatus for conducting thermochemical gaseous reactions in the presence of a moving particle form solid material which may or may not be catalytic in nature. Such processes are well known to the petroleum industry, examples of which are catalytic hydrogenation, dehydrogenation, desulfurization, alkylation, polymerization, reforming and cracking of petroleum vapors. Typical of such processes is the catalytic cracking of hydrocarbons, it being well known that gas oils boiling between temperatures of the order of 450 to 750° F. may be converted to gasoline, gas and other products by passing them at reaction conditions of temperature, such as, for example, temperatures of the order of 875° F. at pressures somewhat above atmospheric in contact with a solid adsorptive catalytic contact mass. Usually such contact masses partake of the nature of natural clays, treated clays or synthetic associations of silica, alumina, or silica and alumina, any of which may or may not have other constituents added, such as certain metallic oxides. In a most recent form, this operation has developed as one in which the particle form solid contact mass material is moved cyclically through two zones in the first of which it is subjected to the hydrocarbon reaction and in the second of which it is subjected to the action of a combustion supporting gas acting to burn therefrom a carbonaceous contaminant deposited thereon in the hydrocarbon conversion zone. This contaminant tends to decrease the catalytic effectiveness of the contact mass material for the hydrocarbon conversion reaction and must be removed therefrom in order to regenerate the catalyst to the normal effectiveness. The combustion of said contaminant results in the liberation of large quantities of heat which, if permitted to accumulate in the contact mass material will result in the overheating of said material to temperatures which will cause permanent deterioration of its catalytic effectiveness. The provision of a suitable method and apparatus for the removal of contaminant deposits from such contact mass material which not only permits accurate control of the temperature thereof during such regeneration, but which are also simple and inexpensive of construction has long been a major and difficult problem to the industry.

Such a method and apparatus was described in United States Patent 2,417,399, issued March 11, 1947, and United States Patent 2,436,780, issued February 24, 1948. This invention provides an improvement of the method and apparatus shown therein and its importance is indicated by its use in present designs of certain continuous catalytic hydrocarbon conversion processes.

A major object of this invention is the provision of a simple and efficient method and apparatus for conducting thermochemical gaseous reactions in the presence of particle form solid material while controlling the temperature of said solid material between predetermined limits. A specific object of this invention is the provision of a method and apparatus for regeneration of contaminant bearing solid adsorbent materials under controlled elevated temperature conditions, which method and apparatus offer high capacity and simplicity of design.

Figure 2:
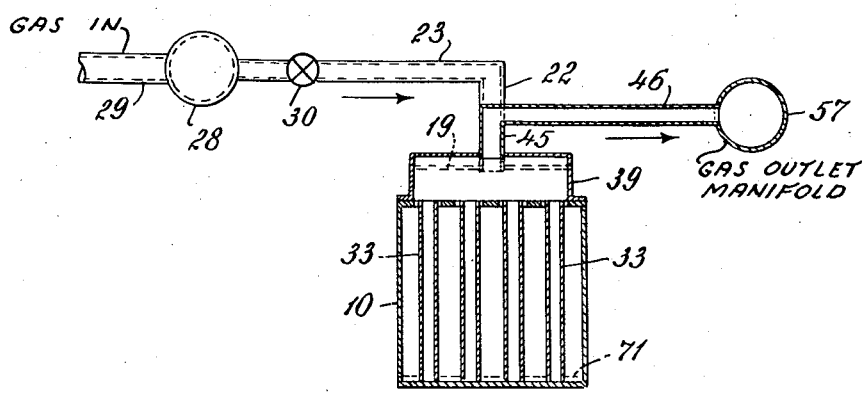

In order to better understand the invention, reference should now be made to the drawings attached hereto, of which Figure 1 is an elevational view, partially in section, of a preferred form of the apparatus of this invention and Figure 2 is a plan view, partially in section, taken at line 2—2 in Figure 1. Both of these drawings are highly diagrammatic in form.

Turning now to Figure 1, we find an elongated vertical vessel 10, suitable for confining a substantially compact column of downwardly flowing particle form solid contact mass material therein. Connected through the top 11 of said vessel is the conduit 12 for introducing said solid material into said vessel; and connected to the tapered bottom 13 of said vessel is the solid material drain conduit 14 having flow throttle valve 15 thereon. A number of rows of spaced gas distributing channels 16, 17 and 18 are positioned at spaced vertical intervals within the vessel. Said channels are inverted, having angle shaped tops and extend across the vessel in a direction perpendicular to the plane of the drawing; and the channels in each row are horizontally spaced apart so as to permit flow of said solid material therebetween. These channels extend through the vessel shell on one side so as to be in free gaseous communication with gas tight inlet manifold boxes 19, 20 and 21, corresponding to rows of channels 16, 17 and 18, respectively. The manifold boxes 19, 20 and 21 are provided with gas inlet conduits 22, 24 and 26, respectively, connected in turn to inlet conduits 23, 25 and 27, respectively. The inlet conduits 23, 25 and 27 connect in turn into the main gas inlet riser manifold 28 to which gas is supplied through conduit 29. Valves 30, 31 and 32 provided on conduits 23, 25 and 27 permit regulation of the gas flow to each header box. Also positioned within the vessel are similar rows of gas collecting channels 33 through 38, inclusive, provided with outlet manifold boxes 39 through 44, inclusive, respectively. The outlet manifold boxes 39 through 44 are provided with outlet conduits 45, 47, 49, 51, 53 and 55, respectively, connected in turn to conduits 46, 48, 50, 52, 54 and 56, respectively. The latter conduits in turn connect into outlet stack 57. Thus the vessel is divided into a number of vertically spaced stages, of which three are shown, each of said stages having a row of gas outlet channels adjacent its upper and lower ends and a row of gas inlet channels located substantially midway therebetween. Thus in the uppermost stage, gas entering under the channels 16 passes out from below said channels into the column of solid material, part of the gas flowing upwardly therethrough and finally disengaging therefrom to pass under the collector channels 33 and the other part of the gas passing downwardly through the solid material column and finally disengaging therefrom to flow under the channels 34. Each stage is vertically spaced apart thereby providing a column of solid material therebetween which will serve as a seal to prevent interflow of gases between stages. Heat exchange conduits or coils 80 are supported within the vessel by suitable means (not shown) in the intermediate location between the uppermost stages and similar coils 81 and 82 are provided between the lowermost stages and coils 60 and 61 below the lowermost stage. Both ends of each of these coils extend through one side of the vessel, one end connecting into an inlet riser pipe 65 supplied with heat exchange medium through conduit 66 and the other end connecting into an outlet riser pipe 67, from which heat exchange medium may be withdrawn through conduit 68. Throttle valves 84 and pressure relief valves 85 are provided on the inlet end of each coil and a throttle valve 83 is also provided on the outlet end of each coil. Thus where double rows of coils are provided, the heat exchange fluid may be admitted to both rows, or to one row, while excluding it from the other, thereby permitting regulation of the rate of heat removal. Within the tapered bottom section 13 of the vessel are provided the horizontal partitions 69 and 70 which have properly spaced orifices therethrough. The orifices in these partitions are so numbered and spaced as to permit division of the solid material flow into a plurality of small streams uniformly distributed as regards the vessel cross-section which are then proportionately and gradually recombined into the single outlet stream flowing through conduit 14. The arrangement thereby provides substantially uniform downward flow of the solid material across the entire vessel cross-section thereabove so that all the solid material will be equally exposed to the regeneration gas.

Turning now to Figure 2, which is a sectional view taken at line 2—2 in Figure 1, which is the level of the collector channels 33. In Figure 2 is shown the vessel 10 and the channels 33, which are supported and closed on one end by the plate member 71 and on the other end by the vessel shell through which they extend. Also shown connected to the shell are the members forming the outlet manifold box 39, to which is connected the conduit 45, in turn connected to conduit 46, in turn connected to outlet stack 57. Also shown is the main inlet conduit 29, manifold 28 and inlet conduits 23 and 22, the latter connecting into gas inlet manifold box 19. In order to avoid confusion, the heat exchange coils 80 at a lower level in the vessel, are not shown in Figure 2.

Again considering Figure 1, we may study the operation of the apparatus, when used for the regeneration of a particle form solid catalytic material in conjunction with a cyclic catalytic hydrocarbon conversion system of the type hereinbefore discussed. Particle form solid catalytic material bearing a carbonaceous contaminant deposited thereon during its previous passage through a hydrocarbon conversion vessel is introduced to the regeneration vessel 10 through conduit 12. The solid material thus introduced may be at a temperature of the order of 800° F., which is in the neighborhood of the temperature required for initiating the contaminant combustion. The solid material then passes downwardly through the uppermost burning zone, while being contacted with a combustion supporting gas, such as air, acting to burn the contaminant. Due to the heat liberated by the combustion reaction the solid material may be heated thereby to a temperature of the order of 1100° F. by the time it has reached the row of collector channels 34, representing the lower end of the first burning stage. The solid material in this example may be assumed to be susceptible to heat damage, if heated substantially above 1200° F. Thus, in order to prevent such overheating in the next burning stage, heat is removed from the solid material during its passage between rows of channels 34 and 35 by means of the heat exchange fluid passed through coil 80. The temperature of the solid material entering the next burning stage (that is adjacent the channels 35) may be of the order of 900° F. The solid material may be again heated to a temperature of 1100° F. during its passage through this burning stage and the above described cooling and burning cycle will be repeated through the remaining stages of the regenerator until the solid material finally reaches the coils 60 and 61 by which its temperature is adjusted to that required for the subsequent hydrocarbon conversion step. The regenerated solid material then passes from the regenerator through conduit 14 and throttle valve 15 by which its flow is controlled so as to maintain the column of said solid material throughout the length of the regenerator. The solid material is then transported by a suitable conveyor to the inlet of the conversion vessel (not shown) of the cyclic system. The rate of contaminant combustion and the rate of heat release may vary in the different burning stages and the solid material inlet temperature required to support active combustion rates may vary as the composition of the contaminant varies during the stages of its removal. Consequently, the solid material temperature range in the various stages may be varied somewhat. Combustion supporting gas, such as air, may be forced by a compressor (not shown) through conduit 29 and riser conduit 28 into the individual air inlet conduits, such as 23 for the uppermost burning stage. The rate of air inlet to the uppermost stage is regulated by means of valve 30 in conduit 23 to an amount at least sufficient to support the desired amount of contaminant combustion in said stage. The gas passes through conduit 22 into inlet manifold box 19, from which it distributes itself under the channels 16. The gas then divides, part flowing upwardly through the solid material column to channels 33 and part flowing downwardly through the column to channels 34. It then passes from these channels through boxes 39 and 40, conduits 45 and 47, and conduits 46 and 48, respectively, finally entering the stack 51.

By thus dividing the gas flow through each stage into two streams instead of one, the maximum allowable gas throughput (as limited by the boiling of the solid material, due to excessive gas flow rates) is greatly increased. This, of course, means increase in contaminant burning capacity for the same volume of regenerator. The maximum gas throughput capacity will be obtained when the velocity of gas flow in both sections of each stage is substantially equal; so it is preferable, in order to provide this, that the lower edge of the gas inlet channels be spaced substantially midway between the lower edges of the outlet channels adjacent either end of each stage. It will be understood, of course, that a less desirable operation may be obtained still within the scope of this invention when the inlet channels are not so centrally positioned in relation to the outlet channels. It will also be understood that the shape of the channels and the means for introducing gas thereunder or withdrawing gas therefrom may take forms other than that shown. In some cases it may be desirable to provide gas inlet means to either end of each inlet channel and outlet means from each outlet channel on either end thereof. It is also possible to use the channels adjacent the ends of the stages as inlet channels and the intermediately located channels as outlet channels. Unless double rows of channels are provided at the intermediate locations of each stage, this modification is a less preferred form of the invention.

The size of the burning stages will be largely dependent upon the nature of the contact material and contaminant deposit involved. Moreover, since the composition of the contaminant may change during the various stages of its removal, giving rise to changing burning rates and rates of heat release, this factor also partially determines the proper stage size. In general, any given burning stage should be of sufficient volumetric capacity to permit an amount of contaminant combustion therein which will heat the contact material passing therethrough from a predetermined inlet temperature, which is of the order of the minimum allowable temperature which will still permit active burning rates, to a set maximum which is below that temperature which would cause heat damage to the contact material. For example, in the regeneration of a clay-type catalyst bearing carbonaceous contaminant deposits, the catalyst should be controlled between the broad limits of 800° F. to 1150° F. This, of course, will vary depending upon the particular catalyst and contaminant involved.

The burning stages should be so proportioned as regards ratio of length to cross-section as to permit the required gas flow therethrough without causing boiling of solid material or serious interference with the flow thereof. Within this limit, considerable flexibility in the ratio is allowable within the scope of this invention. For any given application, certain factors, such as desirable linear velocity of solid material flow and practical consideration of total apparatus height may influence the choice of the stage height to cross-section ratio. It will be apparent, that once the proper stage volume has been set, as above described, then said ratio may be expressed indirectly in terms of vertical spacing between gas inlet and outlet channels. It has been found in the regeneration of catalysts used in hydrocarbon conversion operations, that the vertical distance between gas collector and distributor channels should be preferably less than 50 feet.

The number of burning stages required is to a great extent dependent upon the nature of the operation involved and the total amount of contaminant to be removed. The use of eight to fifteen burning stages with cooling zones between at least most of said stages is not unusual.

The type of heat exchange system to be used in conjunction with the cooling coils is to a great extent optional. Liquid heat exchange mediums, such as certain inorganic molten salts, may be circulated through said coils by a suitable pump and also circulated through an externally located heater or cooler depending upon whether heat is to be supplied or removed from the solid material. In the case of a regenerator, of the type above described, it has been found preferable to pass boiler feed water under controlled pressure through the coils, while controlling the rate of water flow so as to permit part of the circulation to be vaporized during its passage through the coils. Such a system permits recovery of the heat removed as steam at desirable pressures. It will be understood that the heat transfer coils may take forms differing from that diagrammatically shown in Figure 1. Also the coils or tubes may be provided with fins to increase the heat transfer surface available. The amount of heat transfer surface required between various stages may vary depending upon the varying amounts of heat released in the different stages and upon desirable variations in the inlet temperature of the solid material to the various stages. It has been found in operations involving regeneration of catalysts from some catalytic cracking operations that the solid material temperature is not sufficiently raised in the uppermost burning stage to require cooling coils between the two uppermost burning stages. The use of two or more rows of cooling coils, between stages where required, is preferable, because by provision of valves on the inlets to each row of coils, the heat exchange fluid may be excluded from some of the rows while admitted to others, thereby permitting control of the rate of heat removal from the solid material.

It will be apparent from the above description, that the method and apparatus of this invention is an answer to the pressing need of the industry for a method and apparatus for regenerating contact materials under controlled temperature conditions, which apparatus is relatively simple of construction and inexpensive. By use of multistage construction, the necessity for complicated vessels having cooling coils or tubes within the burning zone is eliminated. This not only simplifies and reduces the cost of the burning zones, but greatly reduces the cost of the heat exchange system. Due to such construction, advantage may be taken of the high heat transfer rates and of the great reduction in total heat transfer surface requirements obtained from the use of heat exchange fluids maintained at temperatures far below that of the contact material. Moreover, by use of a multistage construction involving further subdivision of the gas flow within each stage, higher gas throughput rates are obtainable, resulting in higher regenerator burning capacity for unit of volume and great reduction in required regenerator size. This is made possible by a very simple arrangement of gas distributing and collecting channels, which in its simplicity differs radically from arrangements used in current regenerators. The channel arrangement of this invention not only provides inherent structural strength and durability, but also permits repair or overhauling of any portion of the regenerator without requiring a total dismantling of the apparatus. Thus any given channel or set of cooling coils may be removed and replaced without interference with the other parts of the regenerator or without even requiring total dismantling of a given stage. This is of considerable practical advantage because it not only reduces the maintenance cost of the apparatus, but it also shortens the time required for overhauling. If desired, and in fact preferably, the burning stages and cooling stages may each be separate open end chambers, which may be stacked one above the other and flanged together. This greatly facilitates the erection and assembly of such regenerators.

The apparatus and method herein disclosed is equally applicable to operations involving endothermic gaseous reactions, such as are involved in the hydrocarbon conversion reactions in the presence of particle form solid catalytic materials as to exothermic catalyst regeneration reactions such as exemplified hereinabove.

It should be understood that the attached drawings and the description of the apparatus of this invention and of the method of operation and application of this invention are merely exemplary in character and are in no way intended to limit the scope thereof.

I claim:

1. A method for removal of contaminant deposits from a particle form solid contact mass material by the action of a combustion supporting gas at controlled elevated temperatures comprising: passing said contaminant bearing solid contact mass material at a controlled rate through a vertical series of burning zones as a substantially compact column of downwardly flowing particle form solid material, introducing a combustion supporting gas into said column of solid material at a substantially centrally located level in each of said zones, causing a portion of the gas introduced into each of said zones to pass upwardly within said column and the remaining portion to flow downwardly within said column to effect combustion of said contaminant, withdrawing gaseous combustion products from said column adjacent either end of each of said zones independently of the gaseous products formed in any other zone while excluding the flow of said gas into the portions of said column between said zones, passing an externally controlled heat exchange fluid in indirect heat transfer relationship with said column of solid material in said portions of said column between most of said zones to control the range of temperature of said solid material passing through said burning zones.

2. A method of operation according to claim 1, characterized in that said heat exchange fluid is passed under controlled conditions in indirect heat transfer relationship with said moving solid material in said column at locatitons between all of said burning zones except between the uppermost two zones.

3. An apparatus for regeneration of contaminant bearing particle form solid adsorbent materials comprising: an elongated vertical vessel suitable for confining a substantially compact column of downwardly flowing particle form solid adsorbent material, means to admit said solid material to the upper end thereof, means to withdraw said solid material from the lower end thereof, a plurality of regeneration gas inlet handling means to said vessel and gas outlet handling means from said vessel at vertically spaced intervals along the length thereof, said gas inlet handling means and gas outlet handling means being arranged in vertically spaced groups, each group comprising three vertically spaced apart handling means of which at least one is a gas inlet type handling means and at least one is a gas outlet type handling means, the uppermost and lowermost handling means in each group being of the same type and being of the same type in all groups and the remaining, intermediately positioned gas handling means in each group being of the opposite type, a plurality of spaced heat transfer conduits positioned within said vessel between each of said groups, means to pass a heat exchange fluid through said conduits.

4. An apparatus for regeneration of a moving contaminant bearing particle form solid contact mass material at controlled elevated temperatures comprising: an elongated vertical vessel suitable for confining a substantially compact column of downwardly moving particle form solid contact mass material, means to admit said solid material to the upper end of said vessel, means to withdraw said solid material from the lower end of said vessel, flow throttling means associated with said withdrawal means, gas handling means to admit regeneration gas to said vessel at a plurality of vertically spaced levels along its length, gas handling means to withdraw spent regeneration gas from said vessel at a second plurality of levels vertically spaced from said inlets, said gas inlet handling means and outlet handling means being arranged in vertically spaced groups, each group comprising three gas handling means of which one is a gas inlet type and at least one is a gas outlet type, the uppermost and lowermost handling means in each group being of the same type and being of the same type in all groups and the intermediately positioned gas handling means in each group being of the opposite type and being positioned substantially midway between the uppermost and lowermost gas handling means, a separate flow control device associated with the gas inlet handling means for each of said groups, heat transfer conduits spaced uniformly across said vessel between at least most of said groups of gas handling means, means to pass a heat exchange medium through said conduits.

5. An apparatus according to claim 6 characterized by the fact that the maximum vertical spacing between said gas inlet means and said gas outlet means in any of said regenerating stages is less than 50 feet.

6. An apparatus wherein a carbonaceous deposit is burned from a particle form solid contact mass material by the action of a combustion supporting gas at controlled elevated temperature comprising: an elongated vertical vessel suitable for confining a substantially compact column of downwardly moving solid contact mass material, means to admit said solid material to the upper end of said vessel, means to withdraw regenerated solid material from the lower end of said vessel, flow throttling means associated with said withdrawal means, a plurality of sets of gas distributing members and gas collecting members spaced across said vessel at vertical intervals, said sets of distributing and sets of collecting members being arranged in vertically spaced groups, each group comprising three vertically spaced apart sets of members of which the members in at least one set are distributing members and the members in at least one set are collecting members, two separate gas handling manifolds outside of said vessel, passage defining means communicating the uppermost and lowermost set of members in each of said groups with one of said gas handling manifolds, passage defining means communicating the intermediately positioned set of members in each group with the other of said gas handling manifolds, heat transfer conduits spaced across said vessel at levels between at least most of said groups, means to pass a fluid heat control medium through said conduits.

7. An apparatus for use in burning carbonaceous deposits from moving particle form solid catlytic material at controlled elevated temperatures comprising: a vertical vessel suitable for confining a substantially compact vertical column of downwardly flowing particle form solid material, means to introduce contaminant bearing particle form solid catalytic material to the upper end of said vessel, means to withdraw regenerated solid material from the lower end thereof, flow throttling means associated with said withdrawal means, a plurality of vertically spaced apart sets of gas handling members, each row comprising two vertically spaced apart horizontal rows of inverted gas collector troughs and substantially midway vertically between said rows of gas collector troughs a row of inverted gas distributor troughs, each trough extending lengthwise horizontally across said vessel, a gas inlet manifolding positioned outside of said vessel, passage defining means communicating said gas inlet manifolding with the row of gas distributor troughs in each of said vertically spaced groups, a plurality of flow trottling devices associated with said passage defining means adapted to prevent independent restriction of the flow passage to the row of distributor troughs in each of said groups, a gas outlet manifolding positioned outside of said vessel, passage defining means communicating said gas outlet manifolding with the two rows of gas collector troughs in each of said groups, heat transfer conduits spaced across said vessel at levels lying only between at least most of said groups of channels, means to pass a fluid heat exchange medium through said conduits.

8. An apparatus according to claim 4, characterized in that said heat transfer conduits are provided between all of said groups with exception of the two lowermost groups.

9. An apparatus according to claim 6, characterized in that said heat transfer conduits between any given groups are arranged in a number of rows across said vessel, and further characterized by flow throttling devices associated with at least some of said rows of conduits between any of said groups, to permit throttling of the heat control medium flow to at least some of said rows of conduits.

THOMAS P. SIMPSON.

REFERENCES CITED

The following references are of record in the file of this patent:

UNITED STATES PATENTS

| Number | Name | Date |
| --- | --- | --- |
| 921,097 | Ellis | May 11, 1909 |
| 1,394,269 | Bourdet | Oct. 18, 1921 |
| 1,577,534 | Miller | Mar. 23, 1926 |
| 1,685,338 | Randolph | Sept. 25, 1928 |
| 1,784,536 | Pantenburg | Dec. 9, 1930 |
| 1,784,626 | Hamill et al. | Dec. 9, 1930 |
| 1,892,319 | Roth | Dec. 27, 1932 |
| 1,905,883 | Barstow et al. | Apr. 25, 1933 |
| 2,226,578 | Payne | Dec. 31, 1940 |
| 2,320,562 | Bransky | June 1, 1943 |
| 2,330,710 | Hemminger | Sept. 28, 1943 |
| 2,372,018 | Ruthruff | Mar. 20, 1945 |
| 2,387,936 | Nicholls et al. | Oct. 30, 1945 |
| 2,409,596 | Simpson et al. | Oct. 15, 1946 |
| 2,417,393 | Evans | Mar. 11, 1947 |

Certificate of Correction

Patent No. 2,458,434.  January 4, 1949.

THOMAS P. SIMPSON

It is hereby certified that error appears in the printed specification of the above numbered patent requiring correction as follows:

Column 9, line 43, claim 7, for the word "prevent" read *permit:* and that the said Letters Patent should be read with this correction therein that the same may conform to the record of the case in the Patent Office.

Signed and sealed this 31st day of May, A. D. 1949.

[SEAL]

THOMAS F. MURPHY,
*Assistant Commissioner of Patents.*